(12) United States Patent
Li et al.

(10) Patent No.: US 10,978,892 B2
(45) Date of Patent: Apr. 13, 2021

(54) CHARGING METHOD, TERMINAL, AND CHARGING ADAPTER

(71) Applicant: Huawei Technologies Co., Ltd., Guangdong (CN)

(72) Inventors: Xuguang Li, Shanghai (CN); Guangwei Zheng, Shanghai (CN); Xuegang Yang, Shanghai (CN); Daohai Xu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/400,650

(22) Filed: May 1, 2019

(65) Prior Publication Data

US 2019/0260212 A1    Aug. 22, 2019

Related U.S. Application Data

(63) Continuation of application No. PCT/CN2017/109012, filed on Nov. 2, 2017.

(30) Foreign Application Priority Data

Nov. 3, 2016   (CN) .......................... 201610958256.2

(51) Int. Cl.
*H02J 7/00*     (2006.01)
*H01R 31/06*    (2006.01)
*H01R 31/08*    (2006.01)

(52) U.S. Cl.
CPC .......... *H02J 7/0029* (2013.01); *H01R 31/065* (2013.01); *H01R 31/08* (2013.01);
(Continued)

(58) Field of Classification Search
CPC .. H02J 7/0029; H02J 7/00036; H02J 7/00039; H02J 7/00034; H01R 31/065; H01R 31/08
See application file for complete search history.

(56) References Cited

U.S. PATENT DOCUMENTS

2014/0049209 A1   2/2014   Chang et al.
2014/0117923 A1   5/2014   Hawawini et al.
(Continued)

FOREIGN PATENT DOCUMENTS

CN    101667166 A    3/2010
CN    104065147 A    9/2014
(Continued)

OTHER PUBLICATIONS

Machine Translation and Abstract of Chinese Publication No. CN101667166, Mar. 10, 2010, 13 pages.
(Continued)

*Primary Examiner* — David V Henze-Gongola
(74) *Attorney, Agent, or Firm* — Conley Rose, P.C.

(57) ABSTRACT

The present application discloses a charging method, a terminal, and a charging adapter. The terminal includes: a USB port, and a processor and a logical circuit respectively coupled to the USB port, where the logical circuit supports a target fast charging protocol, the processor is connected to the logical circuit, the USB port is configured to connect to a charging adapter, and the target fast charging protocol is a fast charging protocol supporting a capability of continuous communication between the terminal and the charging adapter.

20 Claims, 6 Drawing Sheets

(52) U.S. Cl.
CPC .......... *H02J 7/007* (2013.01); *H02J 7/00036* (2020.01); *H02J 7/0069* (2020.01); H02J 7/00 (2013.01); *H02J 7/00034* (2020.01)

(56) References Cited

U.S. PATENT DOCUMENTS

| | | | |
|---|---|---|---|
| 2014/0122909 A1* | 5/2014 | Hawawini | H02J 5/00 713/310 |
| 2015/0035477 A1* | 2/2015 | Wong | H02J 11/00 320/107 |
| 2015/0180244 A1 | 6/2015 | Jung et al. | |
| 2016/0064978 A1 | 3/2016 | Lei et al. | |
| 2016/0105038 A1 | 4/2016 | Chi | |
| 2017/0040822 A1* | 2/2017 | Li | H02J 7/00047 |
| 2018/0278070 A1 | 9/2018 | Zhang | |

FOREIGN PATENT DOCUMENTS

| | | | |
|---|---|---|---|
| CN | 104158251 | A | 11/2014 |
| CN | 104967200 | A | 10/2015 |
| CN | 105305547 | A | 2/2016 |
| CN | 105429245 | A | 3/2016 |
| CN | 105453372 | A | 3/2016 |
| CN | 105471046 | A | 4/2016 |
| CN | 106068596 | A | 11/2016 |
| CN | 106571663 | A | 4/2017 |
| JP | 2015176433 | A | 10/2015 |
| JP | 2015534449 | A | 11/2015 |
| KR | 20150063607 | A | 6/2015 |
| WO | 2016028597 | A1 | 2/2016 |

OTHER PUBLICATIONS

Machine Translation and Abstract of Chinese Publication No. CN104065147, Sep. 24, 2014, 14 pages.
Machine Translation and Abstract of Chinese Publication No. CN104158251, Nov. 19, 2014, 20 pages.
Machine Translation and Abstract of Chinese Publication No. CN105305547, Feb. 3, 2016, 9 pages.
Machine Translation and Abstract of Chinese Publication No. CN105429245, Mar. 23, 2016, 16 pages.
Machine Translation and Abstract of Chinese Publication No. CN105471046, Apr. 6, 2016, 14 pages.
Machine Translation and Abstract of Chinese Publication No. CN106571663, Apr. 19, 2017, 31 pages.
Foreign Communication From a Counterpart Application, Chinese Application No. 201610958256.2, Chinese Office Action dated Jul. 24, 2018, 11 pages.
Foreign Communication From a Counterpart Application, Chinese Application No. 201610958256.2, Chinese Office Action dated Mar. 22, 2019, 12 pages.
Foreign Communication From a Counterpart Application, PCT Application No. PCT/CN2017/109012, English Translation of International Search Report dated Feb. 5, 2018, 3 pages.
Foreign Communication From a Counterpart Application, PCT Application No. PCT/CN2017/109012, English Translation of Written Opinion dated Feb. 5, 2018, 5 pages.
Machine Translation and Abstract of Chinese Publication No. CN104967200, Oct. 7, 2015, 16 pages.
Foreign Communication From a Counterpart Application, European Application No. 17867966.8, Extended European Search Report dated Aug. 2, 2019, 10 pages.

* cited by examiner

CHARGING METHOD, TERMINAL, AND CHARGING ADAPTER

CROSS-REFERENCE TO RELATED APPLICATIONS

This application is a continuation of International Application No. PCT/CN2017/109012, filed on Nov. 2, 2017, which claims priority to Chinese Patent Application No. 201610958256.2, filed on Nov. 3, 2016, all of which are incorporated herein by reference in their entireties.

TECHNICAL FIELD

The present application relates to the field of charging technologies, and in particular, to a charging method, a terminal, and a charging adapter.

BACKGROUND

Currently, power consumption of mobile phones greatly increases compared with traditional mobile phones. Because mobile phones have various applications, mobile phones are actually used for a much longer time. As battery energy density is not greatly improved, although battery capacities of mobile phones are relatively greatly improved compared with traditional mobile phones, standby time of mobile phones generally cannot satisfy requirements of consumers. Therefore, mobile phones need to be frequently charged, and are charged for a relatively long time in the prior art. As a result, as mobile phones need to be frequently charged, and charging takes an excessively long time, consumers have very undesirable experience when using the mobile phone.

The prior art resolves the problem of a standby bottleneck of mobile phones mainly by using a fast charging technology.

However, in an existing fast charging technology, an available communication channel that is used to perform refined control over a parameter in a fast charging process does not exist between a terminal and a charging adapter. Therefore, charging safety cannot be ensured.

SUMMARY

Embodiments of the present application provide a charging method, a terminal, and a charging adapter, to perform refined control over a parameter in a fast charging process by establishing a communication channel between a terminal and a charging adapter, thereby improving charging safety.

A first aspect of the embodiments of the present application provides a charging method. The method may be applied to a fast charging process of a terminal. The terminal includes: a universal serial bus (USB) port, and a processor and a logical circuit respectively coupled to the USB port, where the logical circuit supports a target fast charging protocol, the processor is connected to the logical circuit, the USB port is configured to connect to a charging adapter, and different from an existing fast charging protocol, the target fast charging protocol is a fast charging protocol supporting a capability of continuous communication between the terminal and the charging adapter. The method may include: detecting, by the processor, a type of the charging adapter by using the USB port; and if detecting that the type of the charging adapter is a fast charging adapter supporting the target fast charging protocol, establishing, by the processor, a communication link to the charging adapter based on the target fast charging protocol, where the communication link has the capability of continuous communication, and controlling, by using the communication link, a process of fast charging the terminal by the charging adapter. Obviously, the processor establishes the communication link to the charging adapter by using the target fast charging protocol, where the communication link has the capability of continuous communication, and performs refined control over a parameter in the fast charging process by using the communication link, thereby improving charging safety.

In some possible implementations, the USB port may include: a first electrode and a second electrode. In an actual application, the first electrode may be indicated by using D+, and the second electrode may be indicated by using D−. That the processor detects the type of the charging adapter by using the USB port may include: the processor may apply a first level signal to the first electrode by using a preset power source management unit; the processor detects a second level signal on the second electrode after preset duration, to obtain a detected value of the second level signal; and if the detected value of the second level signal is less than a value of the first level signal, the processor determines that the type of the charging adapter is a fast charging adapter supporting the target fast charging protocol. It should be understood that after the terminal is connected to the charging adapter by using the USB, the charging adapter establishes a short circuit connection between the first electrode of the USB and the second electrode of the USB. Therefore, after the processor applies the first level signal to the first electrode of the USB by using the preset power source management unit, the first level signal is also obtained correspondingly on the second electrode of the USB. In a normal case, when the processor detects the second level signal on the second electrode of the USB after the preset duration, the detected value of the second level signal should be the same as the value of the first level signal. However, in the present application, to detect whether the type of the charging adapter is a fast charging adapter supporting the target fast charging protocol, the processor applies the first level signal to the first electrode of the USB by using the preset power source management unit, and the charging adapter breaks the short circuit connection between the first electrode and the second electrode, and adjusts the first level signal on the second electrode to the second level signal by using a pull-down resistor. The value of the adjusted second level signal is less than the value of the first level signal. Certainly, the value of the second level signal may alternatively be 0, and specifics are not limited herein. In other words, if the detected value of the second level signal that is detected by the processor on the second electrode of the USB is less than the value of the first level signal, it may be determined that the type of the charging adapter is a fast charging adapter supporting the target fast charging protocol. If the detected value of the second level signal that is detected by the processor on the second electrode of the USB is equal to the value of the first level signal, it may be determined that the charging adapter is a charging adapter not supporting the target fast charging protocol.

In some other possible implementations, the establishing, by the processor, a communication link to the charging adapter based on the target fast charging protocol, where the communication link has the capability of continuous communication may include: sending, by the processor, a sounding signal to the charging adapter based on the target fast charging protocol, where the sounding signal is used to detect whether the communication link is successfully established; and if receiving a feedback signal sent by the charging adapter in response to the sounding signal, establishing, by the processor, the communication link to the charging adapter, where the communication link has the capability of continuous communication. In an actual application, the processor may send a primary device ping to the charging adapter based on the target fast charging protocol. If the processor has received a secondary device ping that is sent by the charging adapter and that corresponds to the primary device ping, the processor establishes the communication link to the charging adapter, where the communication link has the capability of continuous communication.

In some other possible implementations, the terminal may further include a first counter and a second counter. The method may further include: if the processor has not received the feedback signal sent by the charging adapter in response to the sounding signal, increasing, by the processor, a value of the first counter based on a first preset rule, for example, increasing the value of the first counter by 1; if a quantity of times that is recorded by the first counter is greater than a first preset threshold, increasing, by the processor, a value of the second counter based on a second preset rule, for example, increasing the value of the second counter by 1; and if a quantity of times that is recorded by the second counter is greater than a second preset threshold, stopping, by the processor, sending the sounding signal. In an actual application, the first preset threshold may be 5, and the second preset threshold may be 3. This is not limited herein. Further, if the quantity of times that is recorded by the first counter is not greater than the first preset threshold, the processor repeatedly sends the sounding signal. If the quantity of times that is recorded by the second counter is not greater than the second preset threshold, the processor controls the first counter to perform an initialization operation.

In some other possible implementations, before the sending, by the processor, a sounding signal to the charging adapter based on the target fast charging protocol, the method further includes: separately initializing, by the processor, the first counter and the second counter, for example, resetting the quantity of times that is recorded by the first counter and the quantity of times that is recorded by the second counter.

In some other possible implementations, the terminal further includes a third counter. The method may further include: if the processor has not received the feedback signal, increasing, by the processor, a value of the third counter based on a third preset rule; determining, by the processor, whether a count currently recorded by the third counter is greater than a third preset threshold, for example, the third preset threshold is 15; and if yes, stopping, by the processor, sending the sounding signal; or if no, repeatedly sending, by the processor, the sounding signal.

In some other possible implementations, if the detected value of the second level signal is not less than the value of the first level signal, it indicates that the type of the charging adapter is a fast charging adapter not supporting the target fast charging protocol. The method may further include: communicating, by the processor, with the charging adapter by using a preset standard charging procedure.

A second aspect of the embodiments of the present application provides a charging method. The method may be applied to a process of fast charging a terminal by a charging adapter. The charging adapter includes: a universal serial bus USB port, and a controller and a logical circuit respectively coupled to the USB port, where the logical circuit supports a target fast charging protocol. The controller is connected to the logical circuit, the USB port is configured to connect to the terminal, the USB port includes: a first electrode and a second electrode, a short circuit connection exists between the first electrode and the second electrode, and the target fast charging protocol is a fast charging protocol supporting a capability of continuous communication between the terminal and the charging adapter. The method may include: detecting, by the controller, whether the first electrode has a first level signal that is applied by the terminal to detect a type of the charging adapter; and when the controller detects that the first level signal is applied to the first electrode, breaking, by the controller, the short circuit connection between the first electrode and the second electrode, and adjusting a level signal of the second electrode from the first level signal to a second level signal, where a value of the second level signal on the second electrode is less than a value of the first level signal, so that the terminal determines, based on that the value of the level signal on the second electrode is less than the value of the level signal on the first electrode, that the type of the charging adapter is a fast charging adapter supporting the target fast charging protocol. Obviously, the controller adjusts the level signal on the second electrode, so that the terminal determines, based on the level signal on the first electrode and the level signal on the second electrode, whether the type of the charging adapter is a fast charging adapter supporting the target fast charging protocol, thereby improving the technical solution of the present application.

In some possible implementations, after the adjusting, by the controller, a level signal on the second electrode from the first level signal to a second level signal, the method further includes: receiving, by the controller, a sounding signal sent by the terminal, where the sounding signal is used to detect whether a communication link is successfully established; and sending, by the controller, a feedback signal to the terminal to respond to the sounding signal, so that the terminal and the controller establish a communication link having the capability of continuous communication. In an actual application, the terminal may send a primary device ping to the charging adapter based on the target fast charging protocol. If the terminal has received a secondary device ping that is sent by the charging adapter and that corresponds to the primary device ping, the terminal establishes the communication link to the charging adapter, where the communication link has the capability of continuous communication.

In some other possible implementations, the charging adapter may further include: a pull-down resistor and a switch, where the pull-down resistor is disconnected from the second electrode by using the switch. The adjusting, by the controller, a level signal of the second electrode from the first level signal to a second level signal may include: connecting, by the controller, the pull-down resistor to the second electrode by using the switch, and adjusting the level signal of the second electrode from the first level signal to the second level signal by using the pull-down resistor. In an actual application, the value of the second level signal may be 0.

A third aspect of the embodiments of the present application provides a terminal. The terminal is configured to perform a function of the method according to the first aspect or any optional implementation of the first aspect. The terminal may include: a universal serial bus USB port, and a processor and a logical circuit respectively coupled to the USB port, where the logical circuit supports a target fast charging protocol. The processor is connected to the logical circuit, the USB port is configured to connect to the charging adapter, and the target fast charging protocol is a fast charging protocol supporting a capability of continuous communication between the terminal and the charging adapter. The processor is configured to perform a function of corresponding processing.

A fourth aspect of the embodiments of the present application provides a charging adapter. The charging adapter is configured to perform a function of the method according to the second aspect or any optional implementation of the second aspect. The charging adapter may include: a universal serial bus USB port, and a controller and a logical circuit respectively coupled to the USB port, where the logical circuit supports a target fast charging protocol. The controller is connected to the logical circuit, the USB port is configured to connect to the terminal, the USB port includes: a first electrode and a second electrode, a short circuit connection exists between the first electrode and the second electrode, and the target fast charging protocol is a fast charging protocol supporting a capability of continuous communication between the terminal and the charging adapter. The controller is configured to perform a function of corresponding control.

In the technical solutions of the embodiments of the present application, the terminal establishes the communication link to the charging adapter by using the target fast charging protocol, where the communication link has the capability of continuous communication, and performs refined control over a parameter in the fast charging process by using the communication link, thereby ensuring charging safety.

DESCRIPTION OF EMBODIMENTS

Figure 1:
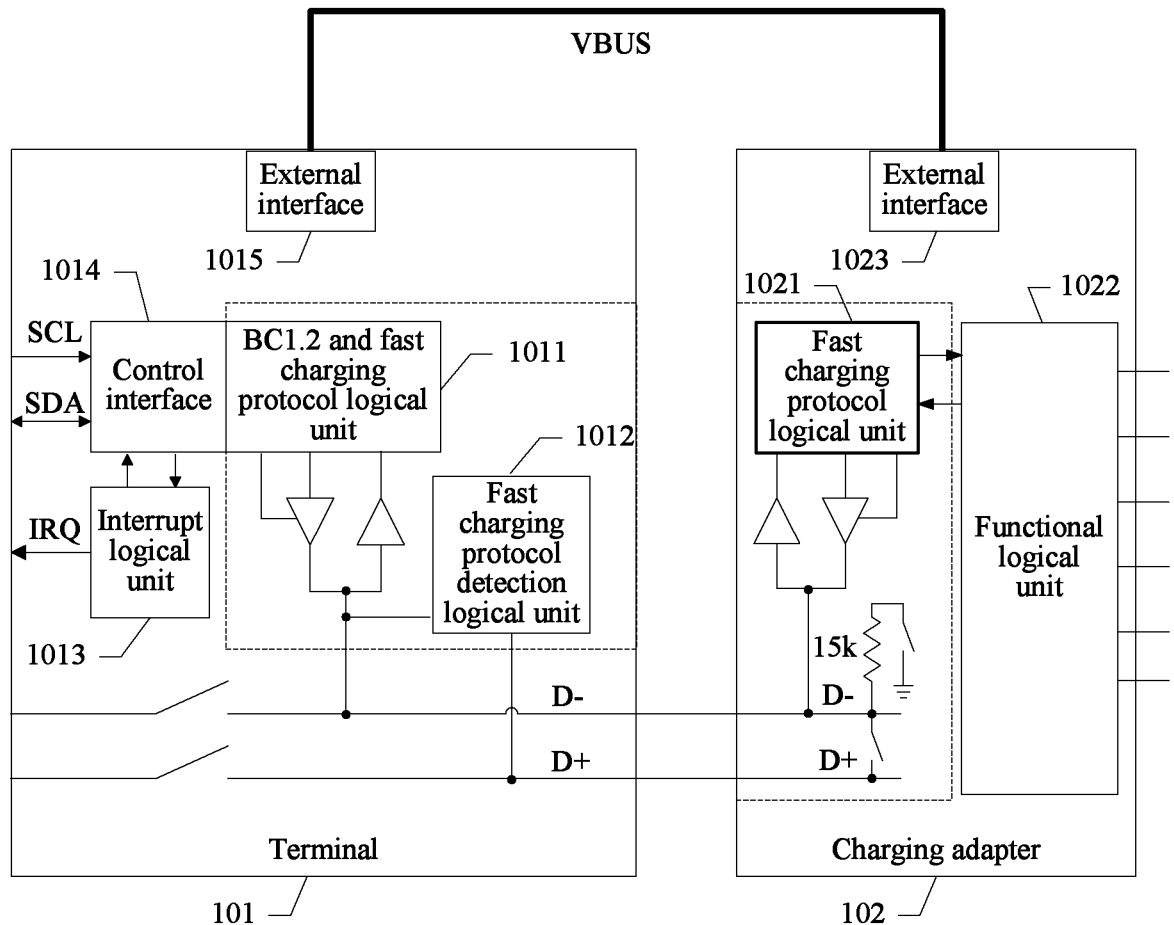
FIG. 1 is a modular block diagram of an embodiment of a terminal and a charging adapter according to an embodiment of the present application.

The following clearly describes the technical solutions in the embodiments of the present application with reference to the accompanying drawings in the embodiments of the present application. Apparently, the described embodiments are merely some but not all of the embodiments of the present application. All other embodiments obtained by persons skilled in the art based on the embodiments of the present application without creative efforts shall fall within the protection scope of the present application.

In the specification, claims, and accompanying drawings of the present application, the terms "first", "second", "third", "fourth", and so on (if any) are intended to distinguish between similar objects but do not necessarily indicate a specific order or sequence. It should be understood that the data termed in such a way are interchangeable in proper circumstances so that the embodiments of the present application described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

Fast charging technologies are currently one of focuses of competition in the field of mobile phones. Although being not a method that fully overcomes a standby bottleneck of mobile phones, fast charging technologies are a viable choice, and can provide a faster and safer charging process for consumers, and bring convenience and better experience to users. The following examples are two common fast charging technologies:

Example 1

Qualcomm (QC) launches a fast charging technology of QC2.0/QC3.0. In the fast charging technology of QC2.0, a charging adapter outputs a corresponding voltage (as shown in Table 1) by detecting voltages of D+ and D− of a USB port. This is currently a fast charging technology relatively widely applied.

TABLE 1

| D+ | D− | Output |
|---|---|---|
| 0.6 V | 0.6 V | 12 V |
| 3.3 V | 0.6 V | 9 V |
| 3.3 V | 3.3 V | 20 V |
| 0.6 V | GND | 5 V (default value) |

Compared with QC2.0, QC3.0 can implement output voltage control in a more refined manner. QC3.0 uses an increment of 200 mV as a step and provides a voltage option ranging from 3.6 V to 20 V.

Example 2

MediaTek Inc. (MTK) launches a fast charging technology of PE/PE+. In the fast charging technology of PE/PE+, a charging adapter outputs a corresponding pulse sequence by detecting a power source cable VBUS of a USB port, to increase or decrease an output voltage.

However, in an existing fast charging technology, an available communication channel that is used to perform refined control over a parameter in a fast charging process does not exist between most terminals and charging adapters. Therefore, charging safety cannot be ensured.

Based on this, an embodiment of the present application provides a charging method, to perform refined control over a parameter in a fast charging process by establishing a communication channel between a terminal and a charging adapter, thereby improving charging safety.

Referring to FIG. 1, FIG. 1 is a modular block diagram of an embodiment of a terminal and a charging adapter according to an embodiment of the present application.

The terminal in this embodiment of the present application is alternatively referred to as user equipment (UE), is a device that provides voice and/or data connectivity to a user, and is, for example, a handheld device or an in-vehicle device that has a wireless connection function. Common terminals include, for example, a mobile phone, a tablet computer, a notebook computer, a palmtop computer, a mobile Internet device (MID), and a wearable device such as a smartwatch, a smart band, or a pedometer.

The charging adapter in this embodiment of the present application is a charging adapter that not only has a fast charging capability but also can perform refined control over a parameter in a fast charging process.

As shown in FIG. 1, a terminal 101 includes: a BC1.2 and fast charging protocol logical unit 1011, a fast charging protocol detection logical unit 1012, an interrupt logical unit 1013, a control interface 1014, and an external interface 1015.

The BC1.2 and fast charging protocol logical unit 1011 is configured to detect a type of the charging adapter, and is further configured to: establish a communication channel between the terminal 101 and a charging adapter 102 by enabling a target fast charging protocol, and perform refined control over a parameter in a fast charging process by using the communication channel, thereby ensuring charging safety. The target fast charging protocol is a fast charging protocol supporting a capability of continuous communication between the terminal 101 and the charging adapter 102.

It should be noted that BC1.2 is a battery charging (BC) specification. The battery charging specification defines a method for determining whether the charging adapter 102 connected to the terminal 101 is of a type of a standard downlink port SDP, a charging downlink port CDP, a dedicated charging port DCP, or the like.

For the SDP port, D+ and D− cables have pull-down resistors of 15 kΩ, and a current limiting value is 2.5 mA when the SDP is suspended, 100 mA when the SDP is connected, and is 500 mA when the SDP is connected and configured with relatively high power.

The CDP port not only supports high current charging, but also supports data transmission completely compatible with USB 2.0. The port includes the pull-down resistor of 15 kΩ that is required by communication of D+ and D−, and also includes an internal circuit for switching in a charger detection stage. The internal circuit allows a portable device to distinguish the CDP from another type of port.

The DCP port supports no data transmission, but can provide a current above 1.5 A. A short circuit exists between a D+ cable and a D− cable of the port. Such port supports a wall charger and a car charger that has a relatively strong charging capability.

The fast charging protocol detection logical unit 1012 is configured to detect a target fast charging protocol on the side of the charging adapter 102. The target fast charging protocol is used to establish a communication channel between the terminal 101 and the charging adapter 102, to perform refined control over a parameter in a fast charging process, and improve charging safety.

The interrupt logical unit 1013 is configured to perform an interrupt request (IRQ).

The controller interface 1014 is configured to provide an interface to the BC1.2 and fast charging protocol logical unit 1011 to communicate with a main processor of the terminal device 101. The interface is, for example, an inter-integrated circuit (I2C) bus, including: a clock signal line (SCL) and a data line (SDA).

The external interface 1015 is configured to connect to an external device such as a USB port. The USB port has multiple functions, including data transmission and battery charging.

As shown in FIG. 1, the charging adapter 102 includes: a fast charging protocol logical unit 1021, a functional logical unit 1022, and an external interface 1023.

The fast charging protocol logical unit 1021 is configured to: establish the communication channel between the terminal device 101 and the charging adapter 102 by enabling the target fast charging protocol, and perform refined control over a parameter in a fast charging process by using the communication channel, thereby ensuring charging safety.

The functional logical unit 1022 is configured to perform some additional functions of the charging adapter 102, and the functional logical unit 1022 predefines some registers.

The external interface 1023 is configured to connect to the terminal device 101, and is, for example, a USB port.

FIG. 1 shows a specific modular block diagram of the terminal and the charging adapter. For ease of description of embodiments, based on FIG. 1, FIG. 2 is a simplified modular block diagram of a terminal and a charging adapter.

Figure 2:
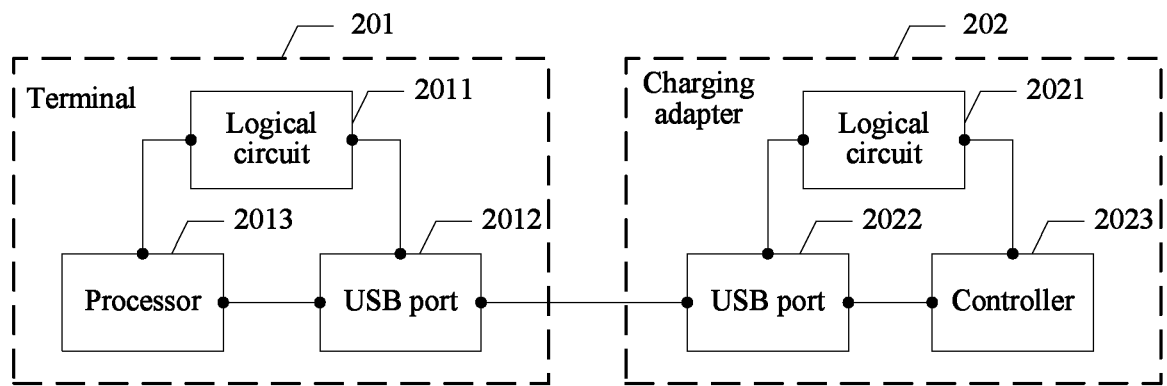
FIG. 2 is a simplified modular block diagram of an embodiment of a terminal and a charging adapter according to an embodiment of the present application.

As shown in FIG. 2, a terminal 201 includes: a logical circuit 2011, a USB port 2012, and a processor 2013. The logical circuit 2011 is configured to perform the function of the BC1.2 and fast charging protocol logical unit 1011 shown in FIG. 1. The USB port 2012 is equivalent to D+ and D− of the terminal shown in FIG. 1. The processor 2013 can perform the function of the fast charging protocol detection logical unit 1012 shown in FIG. 1.

A charging adapter 202 includes: a logical circuit 2021, a USB port 2022, and a controller 2023. The logical circuit 2011 is configured to perform the function of the fast charging protocol logical unit 1021 shown in FIG. 1. The USB port 2022 is equivalent to D+ and D− of the charging adapter shown in FIG. 1. The controller 2023 can perform the function of the functional logical unit 1022 shown in FIG. 1.

Based on the simplified modular block diagram of the terminal and the charging adapter shown in FIG. 2, the following describes a charging method in the embodiments of the present application from different perspectives by using specific embodiments.

Figure 3:
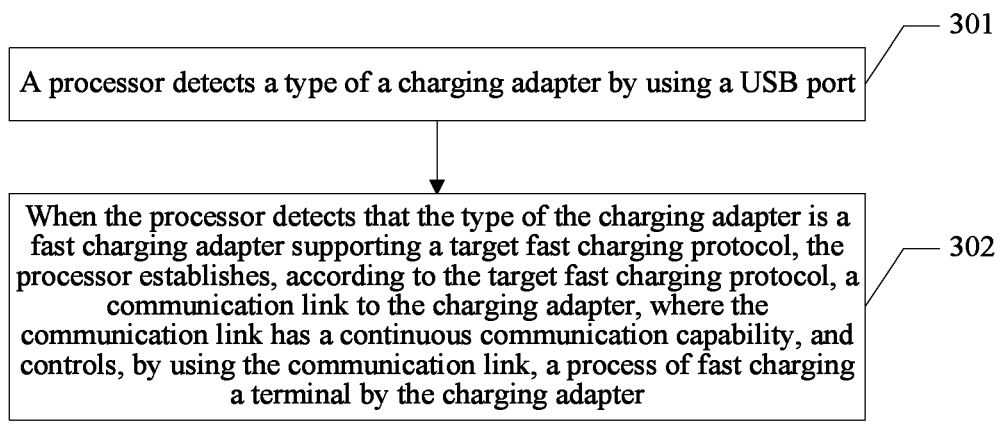
FIG. 3 is a flowchart of an embodiment of a charging method according to an embodiment of the present application.

1. On a Side of a Terminal:

Referring to FIG. 3, FIG. 3 is a flowchart of an embodiment of a charging method according to an embodiment of the present application. The method includes:

301: A processor detects a type of a charging adapter by using a USB port.

In this embodiment, the processor is in the terminal. The terminal may include: a USB port, and a processor and a logical circuit respectively coupled to the USB port, where the logical circuit supports a target fast charging protocol, the processor is connected to the logical circuit, the USB port is configured to connect to a charging adapter, and the target fast charging protocol is a fast charging protocol supporting a capability of continuous communication between the terminal and the charging adapter.

It should be understood that, after the terminal is connected to the charging adapter by using the USB, because the terminal does not know a type of the peer device, the processor of the terminal needs to detect the type of the charging adapter by using the USB port.

302: When the processor detects that the type of the charging adapter is a fast charging adapter supporting a target fast charging protocol, the processor establishes a communication link to the charging adapter based on the target fast charging protocol, where the communication link has a capability of continuous communication, and controls, by using the communication link, a process of fast charging a terminal by the charging adapter.

In this embodiment, if detecting that the type of the charging adapter is a standard charging adapter, the processor communicates with the charging adapter by using a preset standard charging procedure.

In this embodiment, the terminal establishes the communication link to the charging adapter by using the target fast charging protocol, where the communication link has the capability of continuous communication, and performs refined control over a parameter in the fast charging process by using the communication link, thereby ensuring charging safety.

Optionally, in some possible embodiments, the USB port includes: a first electrode and a second electrode. The detecting, by a processor, a type of a charging adapter by using a USB port includes:

applying, by the processor, a first level signal to the first electrode;

detecting, by the processor, a second level signal on the second electrode after preset duration, to obtain a detected value of the second level signal; and if the detected value of the second level signal is less than a value of the first level signal, determining, by the processor, that the type of the charging adapter is a fast charging adapter supporting the target fast charging protocol.

In this embodiment, in an actual application, the first electrode may be indicated by using D+, and the second electrode may be indicated by using D−. It should be understood that after the terminal is connected to the charging adapter by using the USB, the charging adapter establishes a short circuit connection between the first electrode of the USB and the second electrode of the USB. Therefore, after the processor applies the first level signal to the first electrode of the USB by using the preset power source management unit, the first level signal is also obtained correspondingly on the second electrode of the USB. In a normal case, when the processor detects the second level signal on the second electrode of the USB after the preset duration, the detected value of the second level signal should be the same as the value of the first level signal. However, in the present application, to detect whether the type of the charging adapter is a fast charging adapter supporting the target fast charging protocol, the processor applies the first level signal to the first electrode of the USB by using the preset power source management unit, and the charging adapter breaks the short circuit connection between the first electrode and the second electrode, and adjusts the first level signal on the second electrode to the second level signal by using a pull-down resistor. The value of the adjusted second level signal is less than the value of the first level signal. Certainly, the value of the second level signal may alternatively be 0, and specifics are not limited herein. In other words, if the detected value of the second level signal that is detected by the processor on the second electrode of the USB is less than the value of the first level signal, it may be determined that the type of the charging adapter is a fast charging adapter supporting the target fast charging protocol. If the detected value of the second level signal that is detected by the processor on the second electrode of the USB is equal to the value of the first level signal, it may be determined that the charging adapter is a charging adapter not supporting the target fast charging protocol.

Optionally, in some possible embodiments, the establishing, by the processor, a communication link to the charging adapter based on the target fast charging protocol, where the communication link has a capability of continuous communication includes:

sending, by the processor, a sounding signal to the charging adapter based on the target fast charging protocol, where the sounding signal is used to detect whether the communication link is successfully established; and if receiving a feedback signal sent by the charging adapter in response to the sounding signal, establishing, by the processor, the communication link to the charging adapter, where the communication link has the capability of continuous communication.

In this embodiment, in an actual application, the sounding signal may be a primary device ping, and the feedback signal may be a secondary device ping.

Optionally, in some possible embodiments, the terminal further includes: a first counter and a second counter. The method further includes:

if the processor has not received the feedback signal, increasing, by the processor, a value of the first counter based on a first preset rule;

determining, by the processor, whether a count currently recorded by the first counter exceeds a first preset threshold, and if yes, increasing, by the processor, a value of the second counter based on a second preset rule; and determining, by the processor, whether a count currently recorded by the second counter exceeds a second preset threshold, and if yes, stopping, by the processor, sending the sounding signal.

Further, if the count currently recorded by the first counter does not exceed the first preset threshold, the processor repeatedly sends the sounding signal.

Further, if the count currently recorded by the second counter does not exceed the second preset threshold, the processor controls the first counter to perform an initialization operation.

In this embodiment, the increasing, by the processor, a value of the first counter based on a first preset rule may be: increasing, by the processor, a current count of the first counter by 1. For example, when the current count is 1, after the processor increases the current count of 1 by 1, the value of the first counter is changed to 2. The increasing, by the processor, a value of the second counter based on a second preset rule may be: increasing, by the processor, a current count of the second counter by 1. For example, when the current count is 2, after the processor increases the current count of 2 by 1, the value of the second counter is changed to 3. In addition, in an actual application, the first preset threshold may be 5, and the second preset threshold may be 3. This is not limited herein.

It should be understood that, the processor may further increase the value of the first counter in another manner. For example, when the processor has not received the feedback signal for the first time, the processor increases the current count of the first counter by 1, to obtain a first count. When the processor has not received the feedback signal for the second time, the processor increases the first count by 2, to obtain a second count. When the processor has not received the feedback signal for the third time, the processor increases the second count by 3, and so on. Details are not described herein again.

Similarly, the processor may further increase the value of the second counter in another manner. A method used may be similar to the method used by the processor to increase the value of the first counter. Details are not described herein again.

It should be understood that, in this embodiment, the value of the first counter and the value of the second counter may be further increased in another manner. This is not limited herein.

Optionally, in some possible embodiments, the terminal further includes: a third counter. The method further includes:

if the processor has not received the feedback signal, increasing, by the processor, a value of the third counter based on a third preset rule; and determining, by the processor, whether a count currently recorded by the third counter exceeds a third preset threshold; and if yes, stopping, by the processor, sending the sounding signal, or if no, repeatedly sending, by the processor, the sounding signal.

In this embodiment, the increasing, by the processor, a value of the third counter based on a third preset rule may be: increasing, by the processor, a current count of the third counter by 1. For example, when the current count is 1, after the processor increases the current count of 1 by 1, the value of the third counter is changed to 2. In addition, in an actual application, the third preset threshold may be 15. This is not limited herein.

It should be understood that the processor may further increase the value of the third counter in another manner. A method used may be similar to the method used by the processor to increase the value of the first counter. Details are not described herein again.

Optionally, in some possible embodiments, the method further includes:

if the detected value of the second level signal is not less than the value of the first level signal, determining, by the processor, that the type of the charging adapter is a standard charging adapter, and communicating with the charging adapter by using a preset standard charging procedure.

Figure 4:
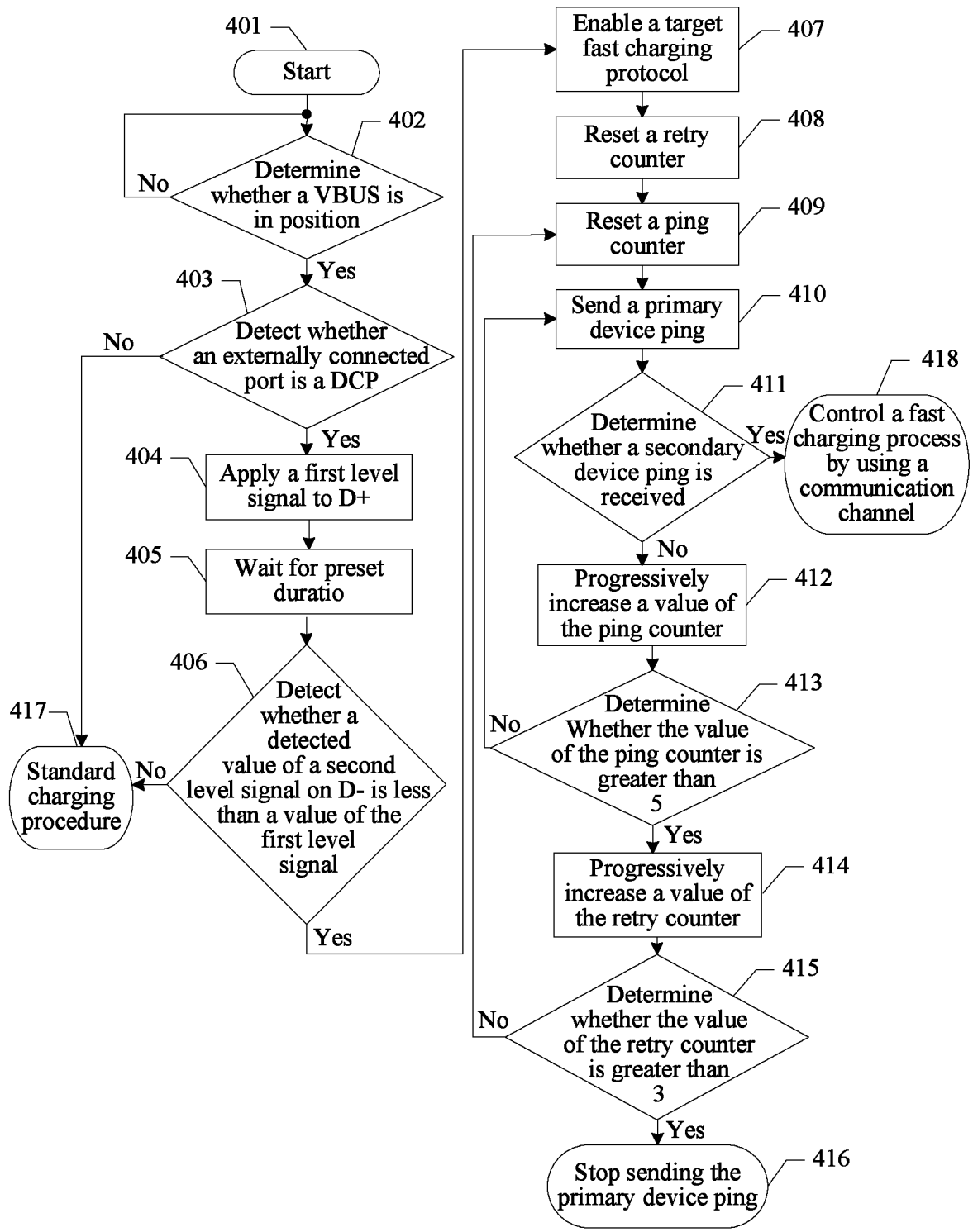
FIG. 4 is a flowchart of another embodiment of a charging method according to an embodiment of the present application.

Referring to FIG. 4, FIG. 4 is a flowchart of another embodiment of a charging method according to an embodiment of the present application. The method includes:

401: Start.

402. Determine whether a voltage bus (VBUS) is present; and if yes, perform 403, or if no, return to step 402.

When determining whether an externally connected device is a charging adapter, a terminal first needs to determine whether a power source cable VBUS of a USB is present.

403. Detect whether an externally connected port is a DCP; and if yes, perform step 404, or if no, perform step 417.

404. Apply a first level signal to D+.

After detecting that the externally connected device is the charging adapter of the DCP, the terminal further detects whether the charging adapter is a fast charging adapter supporting a target fast charging protocol. The target fast charging protocol is a fast charging protocol supporting a capability of continuous communication between the terminal and the charging adapter. Therefore, the terminal applies the first level signal to D+, and waits for a feedback of the charging adapter, to verify whether the charging adapter is a fast charging adapter supporting the target fast charging protocol. The first level signal may be a level VDP_SRC.

It should be noted that the terminal may further include a power source management unit. The terminal may instruct the power source management unit to apply the first level signal to D+.

405. Wait for preset duration.

After the terminal applies the first level signal to D+, a corresponding logical unit on a side of the charging adapter provides a corresponding feedback based on the first level signal. Therefore, when the terminal detects a second level signal on D−, a corresponding delay is required. The preset duration may be Tsettle. In this embodiment of the present application, Tsettle may be 1 millisecond.

406. Detect whether a detected value of a second level signal on D− is less than a value of the first level signal; and if yes, perform step 407, or if no, perform step 417.

After the terminal applies the first level signal to D+, the corresponding logical unit on the side of the charging adapter breaks a short circuit connection between D+ and D−, and adjusts the first level signal on D− to the second level signal by using a pull-down resistor. The detected value of the second level signal may be 0. Specifics are not limited herein.

It should be noted that the terminal continuously applies a level VDP_SRC to D+, until it is detected that the peer charging adapter is removed.

407. Enable a target fast charging protocol.

If the detected value of the second level signal is less than the value of the first level signal, the terminal determines that the type of the charging adapter is a fast charging adapter supporting the target fast charging protocol.

408. Reset a retry counter.

409. Reset a ping counter.

The ping counter is a first counter, and the retry counter is a second counter.

It should be understood that there is no requirement on a sequence of performing step 408 and step 409. The ping counter may be first reset, and then the retry counter is reset. Specifics are not limited herein.

410. Send a primary device ping.

After enabling the target fast charging protocol, the terminal needs to verify whether a communication channel that is between the terminal and the charging adapter and that is carried by a D− signal cable can be successfully established. Therefore, the terminal needs to ping the charging adapter.

411. Determine whether a secondary device ping is received; and if yes, perform step 418, or if no, perform step 412.

If receiving the primary device ping sent by the terminal, correspondingly, the charging adapter feeds back the secondary device ping to the terminal. If having not received the secondary device ping fed back by the charging adapter, the terminal may send the primary device ping to the charging adapter again.

412. Progressively increase a value of the ping counter.

After sending the primary device ping to the fast charging adapter, if the terminal has not received the secondary device ping sent by the charging adapter, the terminal may increase the value of the ping counter by 1.

Certainly, alternatively, the terminal may increase the value of the ping counter by 1 each time the terminal sends the primary device ping to the fast charging adapter, and decreases the value of the ping counter by 1 after receiving the secondary device ping sent by the charging adapter. Specifics are not limited herein.

413. Determine whether the value of the ping counter is greater than 5; and if yes, perform step 414, or if no, return to step 410.

Before sending the primary device ping to the fast charging adapter again, the terminal determines whether the value of the ping counter is greater than a first preset threshold. The first preset threshold is a preset value. In this embodiment of the present application, the first preset threshold is set to 5. If the terminal determines that the value of the ping counter reaches 5, the terminal increases the value of the retry counter by 1, and further determines the value of the retry counter. If the terminal determines that the value of the ping counter does not reach 5, the terminal continues to send the primary device ping to the charging adapter.

414. Progressively increase a value of the retry counter.

If determining that the value of the ping counter reaches 5, the terminal needs to initialize the ping counter, for example, reset the ping counter to 0, increase the value of the retry counter by 1, and further determine the value of the retry counter.

415. Determine whether the value of the retry counter is greater than 3; and if yes, perform step 416, or if no, perform step 409.

The terminal determines whether the value of the retry counter is greater than a second preset threshold. The second preset threshold is also a preset value. In this embodiment of the present application, the second threshold is set to 3. In other words, if the terminal determines that the value of the retry counter exceeds 3, the terminal determines that the communication channel that is between the terminal and the charging adapter and that is carried by the D− signal cable cannot be successfully established. If determining that the value of the retry counter does not exceed 3, the terminal continues to send the primary device ping to the charging adapter, until the charging adapter feeds back the secondary device ping.

416. Stop sending the primary device ping.

If determining that the value of the retry counter exceeds 3, the terminal stops sending the primary device ping, and determines that the communication channel that is between the terminal and the charging adapter and that is carried by the D− signal cable cannot be successfully established, and the terminal may perform charging based on an ordinary charging procedure.

417. Enter a standard charging procedure.

418. Control a fast charging process by using a communication channel.

In this embodiment, the terminal establishes the communication link to the charging adapter by using the target fast charging protocol, where the communication link has the capability of continuous communication, and performs refined control over a parameter in the fast charging process by using the communication link, thereby ensuring charging safety.

Figure 5:
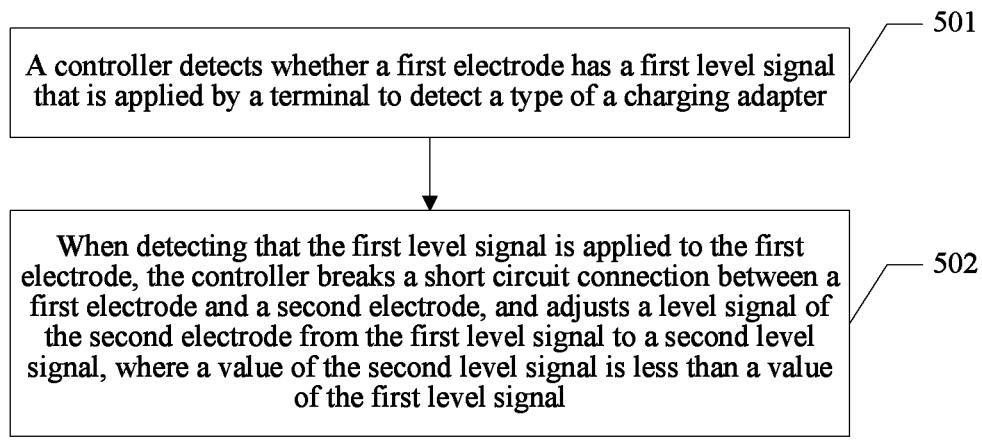
FIG. 5 is a flowchart of another embodiment of a charging method according to an embodiment of the present application.

2: On a Side of a Charging Adapter:

Referring to FIG. 5, FIG. 5 is a flowchart of another embodiment of a charging method according to an embodiment of the present application. The method includes:

501: A controller detects whether a first electrode has a first level signal that is applied by a terminal to detect a type of a charging adapter.

In this embodiment, the terminal applies the first level signal to the first electrode. The first level signal is used to detect the type of the charging adapter.

502. When detecting that the first level signal is applied to the first electrode, the controller breaks a short circuit connection between a first electrode and a second electrode, and adjusts a level signal of the second electrode from the first level signal to a second level signal, where a value of the second level signal is less than a value of the first level signal.

In this embodiment, when the controller adjusts the level signal of the second electrode from the first level signal to the second level signal, and the value of the second level signal is less than the value of the first level signal, the terminal may determine, based on the value of the first level signal and the value of the second level signal, that the type of the charging adapter is a fast charging adapter supporting the target fast charging protocol.

In this embodiment, the controller adjusts the level signal on the second electrode, so that the terminal determines, based on the level signal on the first electrode and the level signal on the second electrode, whether the type of the charging adapter is a fast charging adapter supporting the target fast charging protocol, thereby improving the technical solution of the present application.

Optionally, in some possible embodiments, after the adjusting, by the controller, a level signal of the second electrode from the first level signal to a second level signal, the method further includes:

receiving, by the controller, a sounding signal sent by the terminal, where the sounding signal is used to detect whether a communication link is successfully established; and sending, by the controller, a feedback signal to the terminal to respond to the sounding signal, so that the terminal and the controller establish a communication link having the capability of continuous communication.

In this embodiment, in an actual application, the terminal may send a primary device ping to the charging adapter based on the target fast charging protocol. If the terminal has received a secondary device ping that is sent by the charging adapter and that corresponds to the primary device ping, the terminal establishes the communication link to the charging adapter, where the communication link has the capability of continuous communication.

Optionally, in some possible embodiments, the charging adapter may further include: a pull-down resistor and a switch, and the pull-down resistor is disconnected from the second electrode by using the switch. The adjusting, by the controller, a level signal of the second electrode from the first level signal to a second level signal may include: connecting, by the controller, the pull-down resistor to the second electrode by using the switch, and adjusting the level signal of the second electrode from the first level signal to the second level signal by using the pull-down resistor. In an actual application, the value of the second level signal may be 0.

Figure 6:
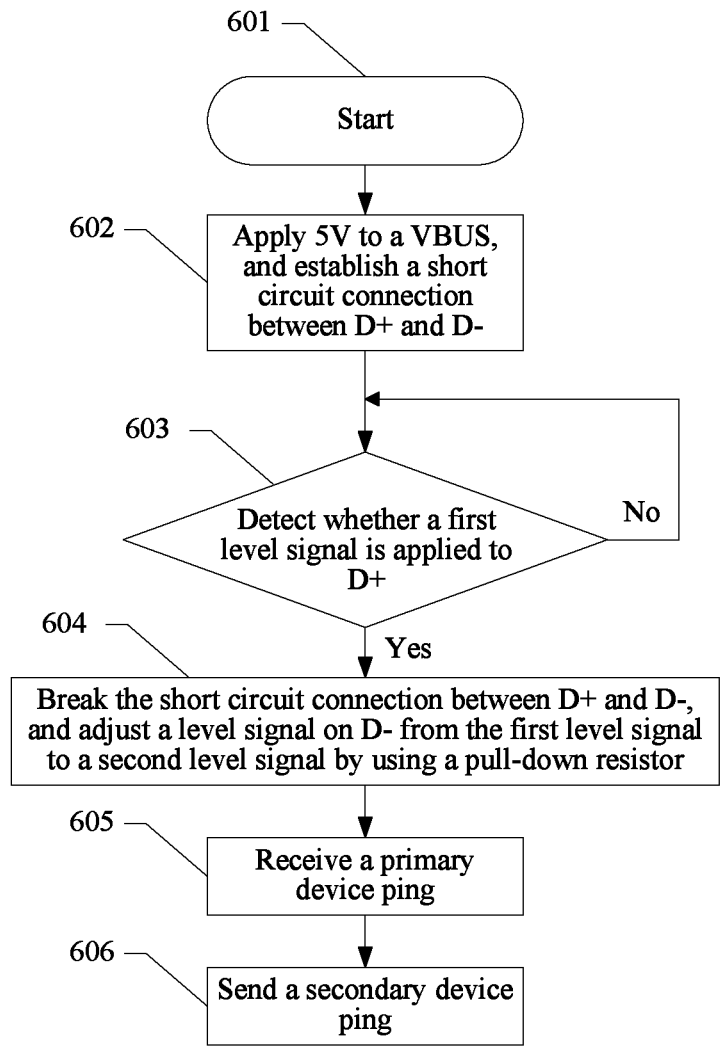
FIG. 6 is a flowchart of another embodiment of a charging method according to an embodiment of the present application.

Referring to FIG. 6, FIG. 6 is a flowchart of another embodiment of a charging method according to an embodiment of the present application. The method includes:

601: Start.

602. Apply 5 V to a VBUS, and establish a short circuit connection between D+ and D−.

After the charging adapter is connected to the terminal by using the VBUS on a USB, the charging adapter establishes a short circuit connection between D+ and D− of the USB, and applies a level signal of 5 V to the VBUS on the USB.

603. Detect whether a first level signal is applied to D+; and if yes, perform step 604.

The charging adapter detects whether D+ has the first level signal applied by the terminal to detect the type of the charging adapter, and if no, continues to perform detection.

604. Break the short circuit connection between D+ and D−, and adjust a level signal on D− from the first level signal to a second level signal by using a pull-down resistor.

In an actual circuit, the charging adapter may further include: a pull-down resistor and a switch, and the pull-down resistor is disconnected from D− by using the switch.

If detecting that the first level signal is applied to D+, the charging adapter breaks the short circuit connection between D+ and D−. Then, the charging adapter may connect the pull-down resistor to D− by using the switch, and adjust the level signal of D− from the first level signal to the second level signal by using the pull-down resistor.

605. Receive a primary device ping.

A sounding signal sent by the terminal is received, and the sounding signal may be a primary device ping used to detect whether a communication channel is successfully established.

606. Send a secondary device ping.

After the primary device ping sent by the terminal is received, the secondary device ping is fed back to the terminal, so that the terminal establishes a communication channel to the charging adapter, where the communication channel has a capability of continuous communication.

In this embodiment, the charging adapter adjusts the level signal on D+ and D−, so that the terminal determines, based on the level signal on D+ and the level signal on D−, whether the type of the charging adapter is a fast charging adapter supporting the target fast charging protocol, thereby improving the technical solution of the present application.

Figure 7:
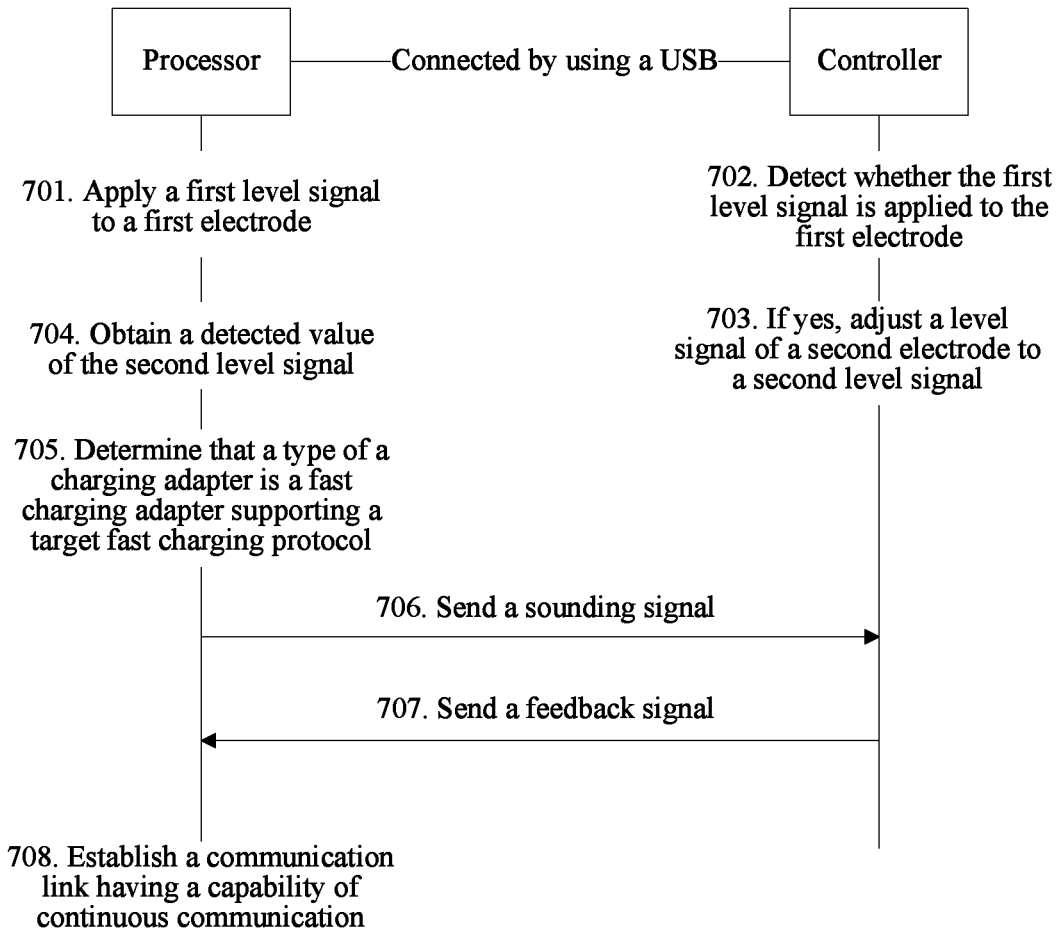
FIG. 7 is a flowchart of another embodiment of a charging method according to an embodiment of the present application.

3: On a Side of Interaction Between a Terminal and a Charging Adapter:

Referring to FIG. 7, FIG. 7 is a flowchart of another embodiment of a charging method according to an embodiment of the present application. The method includes:

701: A processor applies a first level signal to a first electrode.

702. A controller detects whether the first level signal is applied to the first electrode.

703. After detecting that the first level signal is applied to the first electrode, the controller breaks a short circuit connection between a first electrode and a second electrode, and adjusts a level signal of the second electrode from the first level signal to a second level signal by using a pull-down resistor.

704. The processor detects the second level signal on the second electrode after preset duration, to obtain a detected value of the second level signal, where the detected value of the second level signal is less than a value of the first level signal.

705. The processor determines that a type of a charging adapter is a fast charging adapter supporting a target fast charging protocol.

706. The processor sends a sounding signal to the charging adapter based on the target fast charging protocol.

707. The controller sends a feedback signal to the processor to respond to the sounding signal.

708. The controller establishes, based on the feedback signal, a communication link having a capability of continuous communication.

It should be understood that, the processor is connected to the controller in advance by using a USB. In addition, for related descriptions of the steps in this embodiment, refer to the foregoing embodiments. Details are not described herein again.

In addition, to ensure charging safety, in this embodiment, detection is further performed when the terminal is disconnected from the charging adapter, that is, removal detection is performed. Specifically, when the terminal is disconnected from the fast charging adapter, the terminal and the charging adapter restore respective interfaces and settings. The removal detection includes two types of detection: signal detection and protocol detection. Only signal detection may be supported, or both the two types of detection may be supported. Specifics are not limited herein.

During signal detection, the terminal may detect VBUS removal, and the fast charging adapter may detect whether a value of the level signal on the first electrode is less than a reference level threshold.

During protocol detection, the terminal may send a sounding signal to the charging adapter, and detect a response of the charging adapter. The charging adapter may detect, by using a watchdog mechanism, whether the sounding signal from the terminal is continuously received.

The foregoing describes the charging method in the embodiments of the present application, and the following describes a terminal in the embodiments of the present application.

Figure 8:
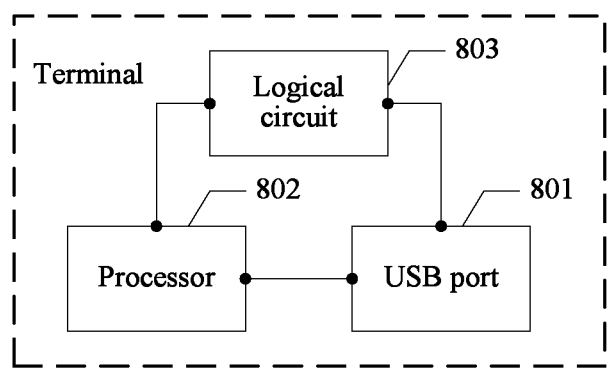
FIG. 8 is a schematic diagram of an embodiment of a terminal according to an embodiment of the present application.

Referring to FIG. 8, FIG. 8 is a schematic diagram of an embodiment of a terminal according to an embodiment of the present application. The terminal includes:

a USB port 801, and a processor 802 and a logical circuit 803 respectively coupled to the USB port 801, where the logical circuit 803 supports a target fast charging protocol, the processor 802 is connected to the logical circuit 803, the USB port 801 is configured to connect to a charging adapter, and the target fast charging protocol is a fast charging protocol supporting a capability of continuous communication between the terminal and the charging adapter, where the processor 802 is configured to: detect a type of the charging adapter by using the USB port 801; and when detecting that the type of the charging adapter is a fast charging adapter supporting the target fast charging protocol, establish a communication link to the charging adapter based on the target fast charging protocol, where the communication link has the capability of continuous communication, and control, by using the communication link, a process of fast charging the terminal by the charging adapter.

In this embodiment, the processor 802 establishes the communication link to the charging adapter based on the target fast charging protocol, where the communication link has the capability of continuous communication, and performs refined control over a parameter in the fast charging process by using the communication link, thereby ensuring charging safety.

For a specific function of the processor 802, refer to the method embodiment shown in FIG. 3 or FIG. 4. Details are not described herein again.

In some optional embodiments, the USB port 801 includes: a first electrode and a second electrode, and the processor 802 is further configured to: apply a first level signal to the first electrode; detect a second level signal on the second electrode after preset duration, to obtain a detected value of the second level signal; and if the detected value of the second level signal is less than a value of the first level signal, determine that the type of the charging adapter is a fast charging adapter supporting the target fast charging protocol.

In some other optional embodiments, the processor 802 is further configured to: enable the target fast charging protocol; send a sounding signal to the charging adapter based on the target fast charging protocol, where the sounding signal is used to detect whether the communication link is successfully established; and if a feedback signal sent by the charging adapter in response to the sounding signal is received, establish the communication link to the charging adapter, where the communication link has the capability of continuous communication.

In some other optional embodiments, the terminal further includes a first counter and a second counter, and the processor 802 is further configured to: if the feedback signal has not been received, increase a value of the first counter based on a first preset rule; determine whether a count currently recorded by the first counter exceeds a first preset threshold, and if yes, increase a value of the second counter based on a second preset rule; and determine whether a count currently recorded by the second counter exceeds a second preset threshold, and if yes, stop sending the sounding signal.

In some other optional embodiments, the processor 802 is further configured to: if the count currently recorded by the first counter does not exceed the first preset threshold, repeatedly send the sounding signal.

In some other optional embodiments, the processor 802 is further configured to: if the count currently recorded by the second counter does not exceed the second preset threshold, control the first counter to perform an initialization operation.

In some other optional embodiments, the processor 802 is further configured to: before sending the sounding signal to the charging adapter based on the target fast charging protocol, separately initialize the first counter and the second counter.

In some other optional embodiments, the terminal further includes a third counter, and the processor 802 is further configured to: if the feedback signal has not been received, increase a value of the third counter based on a third preset rule; and determine whether a count currently recorded by the third counter exceeds a third preset threshold; and if yes, stop sending the sounding signal, or if no, repeatedly send the sounding signal.

In some other optional embodiments, the processor is further configured to: if the detected value of the second level signal is not less than the value of the first level signal, determine that the type of the charging adapter is a standard charging adapter, and communicate with the charging adapter by using a preset standard charging procedure.

The foregoing describes the terminal in the embodiments of the present application, and the following describes a charging adapter in the embodiments of the present application.

Figure 9:
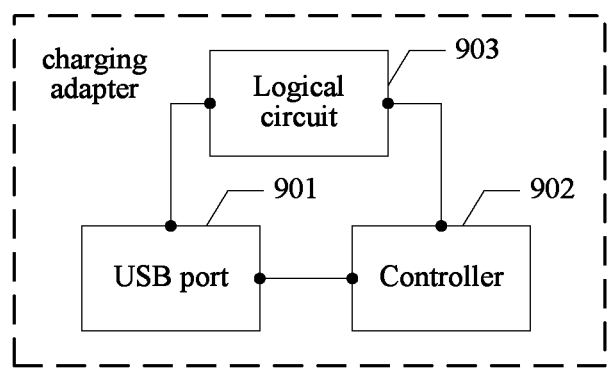
FIG. 9 is a schematic diagram of an embodiment of a charging adapter according to an embodiment of the present application.

Referring to FIG. 9, FIG. 9 is a schematic diagram of an embodiment of a charging adapter according to an embodiment of the present application. The charging adapter includes:

a universal serial bus USB port 901, and a controller 902 and a logical circuit 903 respectively coupled to the USB port 901, where the logical circuit 903 supports a target fast charging protocol, the controller 902 is connected to the logical circuit 903, the USB port 901 is configured to connect to a terminal, the USB port 901 includes a first electrode 9011 and a second electrode 9012, a short circuit connection exists between the first electrode 9011 and the second electrode 9012, and the target fast charging protocol is a fast charging protocol supporting a capability of continuous communication between the terminal and the charging adapter, where the controller 902 is configured to: detect whether the first electrode 9011 has a first level signal that is applied by the terminal to detect a type of the charging adapter; and when detecting that the first level signal is applied to the first electrode 9011, break the short circuit connection between the first electrode 9011 and the second electrode 9012, and adjust a level signal of the second electrode 9012 from the first level signal to a second level signal, so that the terminal determines, based on a value of the first level signal and a value of the second level signal, that the type of the charging adapter is a fast charging adapter supporting the target fast charging protocol, where the value of the second level signal is less than the value of the first level signal.

In this embodiment, the controller 902 adjusts the level signal on the first electrode 9011 and the second electrode 9012, so that the terminal determines, based on the level signal on the first electrode 9011 and the level signal on the second electrode 9012, whether the type of the charging adapter is a fast charging adapter supporting the target fast charging protocol, thereby improving the technical solution of the present application.

For a specific function of the controller 902, refer to the method embodiment shown in FIG. 5 or FIG. 6. Details are not described herein again.

In some optional embodiments, the controller 902 is further configured to: after adjusting the level signal of the second electrode 9012 from the first level signal to the second level signal, receive a sounding signal sent by the terminal, where the sounding signal is used to detect whether a communication link is successfully established; and send a feedback signal to the terminal to respond to the sounding signal, so that the terminal and the controller 902 establish a communication link having the capability of continuous communication.

In some other optional embodiments, the charging adapter further includes: a pull-down resistor and a switch, and the pull-down resistor is disconnected from the second electrode 9012 by using the switch; and the controller 902 is further configured to: connect the pull-down resistor to the second electrode 9012 by using the switch, and adjust the level signal of the second electrode 9012 from the first level signal to the second level signal by using the pull-down resistor.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present application.

What is claimed is:

1. A charging method applied to a fast charging process of a terminal comprising a processor, wherein the method comprises:
    applying, by the processor coupled to a universal serial bus (USB) port comprising a first electrode and a second electrode, a first level signal to the first electrode continuously until detecting that a charging adapter is removed from the terminal, wherein the first level signal instructs the charging adapter to break a short circuit connection between the first electrode and the second electrode, and to adjust a level signal of the second electrode from the first level signal to a second level signal, and wherein the USB port is configured to couple to the charging adapter;
    detecting, by the processor, the second level signal on the second electrode;
    determining, by the processor, that the type of the charging adapter is a fast charging adapter configured to support a target fast charging protocol in response to detecting that a value of the second level signal is less than a value of the first level signal, wherein the target fast charging protocol is a fast charging protocol configured to support continuous communication between the terminal and the charging adapter; and
    in response to determining that the type of the charging adapter is the fast charging adapter configured to support the target fast charging protocol:
        establishing, by the processor, a communication link to the charging adapter based on the target fast charging protocol, wherein the communication link is configured for continuous communication; and
        controlling, using the communication link, a process of fast charging the terminal by the charging adapter.

2. The method according to claim 1, wherein establishing, by the processor, the communication link to the charging adapter based on the target fast charging protocol comprises:
    sending, by the processor, a sounding signal to the charging adapter based on the target fast charging protocol; and
    establishing, by the processor, the communication link to the charging adapter in response to receiving a feedback signal from the charging adapter after sending the sounding signal to the charging adapter.

3. The method according to claim 2, wherein the terminal further comprises a first counter and a second counter, and wherein the method further comprises:
    increasing, by the processor, a value of the first counter based on a first preset rule in response to the feedback signal not being received from the charging adapter after sending the sounding signal to the charging adapter;
    increasing, by the processor, a value of the second counter based on a second preset rule in response to determining that a count currently recorded by the first counter exceeds a first preset threshold; and
    stopping, by the processor, sending the sounding signal in response to determining that a count currently recorded by the second counter exceeds a second preset threshold.

4. The method according to claim 3, further comprising repeatedly sending, by the processor, the sounding signal in response to determining that the count currently recorded by the first counter does not exceed the first preset threshold.

5. The method according to claim 4, further comprising controlling, by the processor, the first counter to perform an initialization operation in response to determining that the count currently recorded by the second counter does not exceed the second preset threshold.

6. The method according to claim 3, wherein before sending the sounding signal to the charging adapter based on the target fast charging protocol, the method further comprises separately initializing, by the processor, the first counter and the second counter.

7. The method according to claim 2, wherein the terminal further comprises a third counter, and wherein the method further comprises:
    increasing, by the processor, a value of the third counter based on a third preset rule in response to the feedback signal not being received; and
    stopping, by the processor, sending the sounding signal in response to determining that a count currently recorded by the third counter exceeds a third preset threshold; and
    repeatedly sending, by the processor, the sounding signal in response to determining that the count currently recorded by the third counter does not exceed the third preset threshold.

8. The method according to claim 1, further comprising:
    determining, by the processor, that the type of the charging adapter is a standard charging adapter in response to the value of the second level signal not being less than the value of the first level signal; and
    communicating with the charging adapter using a preset standard charging procedure.

9. A charging method applied to a process of fast charging a terminal by a charging adapter, comprising:
    detecting, by a controller of the charging adapter, whether a first electrode of a universal serial bus (USB) port has a first level signal that is applied by the terminal to detect a type of the charging adapter, wherein the controller is coupled to the logical circuit configured to support a target fast charging protocol, wherein the controller and the logical circuit are coupled to the USB port, wherein the USB port is configured to be coupled to the terminal and comprises the first electrode and a second electrode, wherein a short circuit connection exists between the first electrode and the second electrode, and wherein the target fast charging protocol is a fast charging protocol configured to support continuous communication between the terminal and the charging adapter; and in response to detecting that the first level signal is applied to the first electrode:
- breaking, by the controller, the short circuit connection between the first electrode and the second electrode;
- adjusting a level signal of the second electrode from the first level signal to a second level signal, wherein a value of the first level signal and a value of the second level signal indicates to the terminal that the type of the charging adapter is a fast charging adapter configured to support the target fast charging protocol, wherein the value of the second level signal is less than the value of the first level signal; and
- detecting, by the controller, that the first level signal is continuously applied on the first electrode until the charging adapter is removed from the terminal.

10. The method according to claim 9, wherein after adjusting, by the controller, the level signal of the second electrode from the first level signal to second level signal, the method further comprises:
- receiving, by the controller, a sounding signal from the terminal; and
- sending, by the controller, a feedback signal to the terminal in response to receiving the sounding signal to establish a communication link capable of continuous communication between the controller and the terminal.

11. The method according to claim 9, wherein the charging adapter further comprises a pull-down resistor and a switch, wherein the pull-down resistor is configured to be disconnected from the second electrode using the switch, and wherein adjusting, by the controller, the level signal of the second electrode from the first level signal to the second level signal comprises:
- electrically connecting, by the controller, the pull-down resistor to the second electrode using the switch; and
- adjusting the level signal of the second electrode from the first level signal to the second level signal using the pull-down resistor.

12. A terminal, comprising:
a universal serial bus (USB) port configured to couple to a charging adapter, wherein the USB port comprises a first electrode and a second electrode;
a logical circuit coupled to the USB port and configured to support a target fast charging protocol, wherein the target fast charging protocol is a fast charging protocol configured to support continuous communication between the terminal and the charging adapter; and
a processor coupled to the USB port and connected to the logical circuit, and wherein the processor is configured to:
- apply a first level signal to the first electrode until the charging adapter is removed from the terminal, wherein the first level signal instructs the charging adapter to break a short circuit connection between the first electrode and the second electrode, and to adjust a level signal of the second electrode from the first level signal to a second level signal;
- detect the second level signal on the second electrode;
- determine that a type of the charging adapter is a fast charging adapter configured to support a target fast charging protocol when a value of the second level signal is less than a value of the first level signal;

when the type of the charging adapter is the fast charging adapter configured to support the target fast charging protocol:
- establish a communication link to the charging adapter based on the target fast charging protocol, wherein the communication link is configured for continuous communication; and
- control, using the communication link, a process of fast charging the terminal by the charging adapter.

13. The terminal according to claim 12, wherein the processor is further configured to:
- send a sounding signal to the charging adapter based on the target fast charging protocol; and
- establish the communication link to the charging adapter when a feedback signal is received from the charging adapter in response to the sounding signal.

14. The terminal according to claim 13, wherein the terminal further comprises a first counter and a second counter, and wherein the processor is further configured to:
- increase a value of the first counter based on a first preset rule when the feedback signal has not been received;
- increase a value of the second counter based on a second preset rule when a count currently recorded by the first counter exceeds a first preset threshold; and
- stop sending the sounding signal when a count currently recorded by the second counter exceeds a second preset threshold.

15. The terminal according to claim 14, wherein the processor is further configured to repeatedly send the sounding signal when the count currently recorded by the first counter does not exceed the first preset threshold.

16. The terminal according to claim 15, wherein the processor is further configured to control the first counter to perform an initialization operation when the count currently recorded by the second counter does not exceed the second preset threshold.

17. The terminal according to claim 14, wherein the processor is further configured to separately initialize the first counter and the second counter before the sounding signal is sent to the charging adapter based on the target fast charging protocol.

18. A charging adapter, comprising:
a universal serial bus (USB) port configured to connect to a terminal and comprising:
- a first electrode;
- a second electrode; and
- a short circuit connection between the first electrode and the second electrode;
a logical circuit coupled to the USB port, wherein the logical circuit is configured to support a target fast charging protocol, wherein the target fast charging protocol is a fast charging protocol configured to support continuous communication between the terminal and the charging adapter; and
a controller coupled to the logical circuit and the USB port, wherein the controller is configured to:
- detect whether the first electrode has a first level signal that is applied by the terminal to detect a type of the charging adapter, and
- when the first level signal is applied to the first electrode:
  - break the short circuit connection between the first electrode and the second electrode;
  - adjust a level signal of the second electrode from the first level signal to a second level signal, wherein a value of the first level signal and a value of the second level signal indicates to the terminal that the type of the charging adapter is a fast charging adapter configured to support the target fast charging protocol, wherein the value of the second level signal is less than the value of the first level signal; and detect that the first level signal is continuously applied on the first electrode until the charging adapter is removed from the terminal.

19. The charging adapter of claim 18, wherein the USB port is configured to:

receive a sounding signal from the terminal; and send a feedback signal to the terminal in response to receiving the sounding signal to establish a communication link capable of continuous communication between the controller and the terminal.

20. The charging adapter of claim 18, wherein the charging adapter further comprises a pull-down resistor and a switch, wherein the pull-down resistor is configured to be disconnected from the second electrode using the switch, and wherein the controller is further configured to:

electrically connect the pull-down resistor to the second electrode using the switch; and adjust the level signal of the second electrode from the first level signal to the second level signal using the pull-down resistor.

\* \* \* \* \*